(12) United States Patent
Williams et al.

(10) Patent No.: US 7,748,787 B2
(45) Date of Patent: Jul. 6, 2010

(54) VEHICLE SEAT SYSTEM

(75) Inventors: David K. Williams, South Lyon, MI (US); Matthew T. Trombley, Allen Park, MI (US); Michael Walkowski, Brownstown, MI (US); Michael R. Ferrari, St. Clair Shores, MI (US)

(73) Assignee: Lear Corporation, Southfield, MI (US)

( * ) Notice: Subject to any disclaimer, the term of this patent is extended or adjusted under 35 U.S.C. 154(b) by 803 days.

(21) Appl. No.: 11/275,039

(22) Filed: Dec. 5, 2005

(65) Prior Publication Data

US 2007/0126275 A1 Jun. 7, 2007

(51) Int. Cl.
*A47C 7/42* (2006.01)
(52) U.S. Cl. .............................. 297/452.27; 297/452.37
(58) Field of Classification Search ............ 297/452.27, 297/452.37
See application file for complete search history.

(56) References Cited

U.S. PATENT DOCUMENTS

| | | | | |
|---|---|---|---|---|
| 2,185,758 | A * | 1/1940 | Todd et al. ...................... 5/402 |
| 2,601,891 | A * | 7/1952 | Hoven et al. ............. 297/450.1 |
| 3,161,436 | A * | 12/1964 | Hood ..................... 297/452.27 |
| 3,751,111 | A * | 8/1973 | Taylor et al. ........... 297/452.27 |
| 4,696,516 | A * | 9/1987 | Yeum .................... 297/452.37 |
| 4,835,801 | A * | 6/1989 | Walpin et al. ................... 5/652 |
| 5,085,488 | A * | 2/1992 | Dal Monte ............. 297/452.32 |
| 5,244,612 | A * | 9/1993 | Iwasawa et al. ............ 264/46.5 |
| 5,580,124 | A | 12/1996 | Dellanno |
| 5,829,838 | A | 11/1998 | Offenbacher |
| 6,447,058 | B1 * | 9/2002 | Jackson ................. 297/216.13 |
| 6,550,856 | B1 | 4/2003 | Ganser et al. |
| 6,893,096 | B2 | 5/2005 | Bonn et al. |
| 2004/0195894 | A1 | 10/2004 | Pal et al. |

* cited by examiner

*Primary Examiner*—Sarah B McPartlin
(74) *Attorney, Agent, or Firm*—Brooks Kushman P.C.

(57) ABSTRACT

A seat system for a vehicle and method of manufacturing the same including a seat foam pad having a headrest portion and a backrest portion. A structural support member is included that is formed of a foam material that is at least partially enclosed by the headrest portion and the backrest portion. The seat system also includes a seat frame having the seat foam pad and the structural support member adjacent thereto, wherein the seat foam pad and the structural support member enable the seat system to meet a predetermined structural requirement.

20 Claims, 4 Drawing Sheets

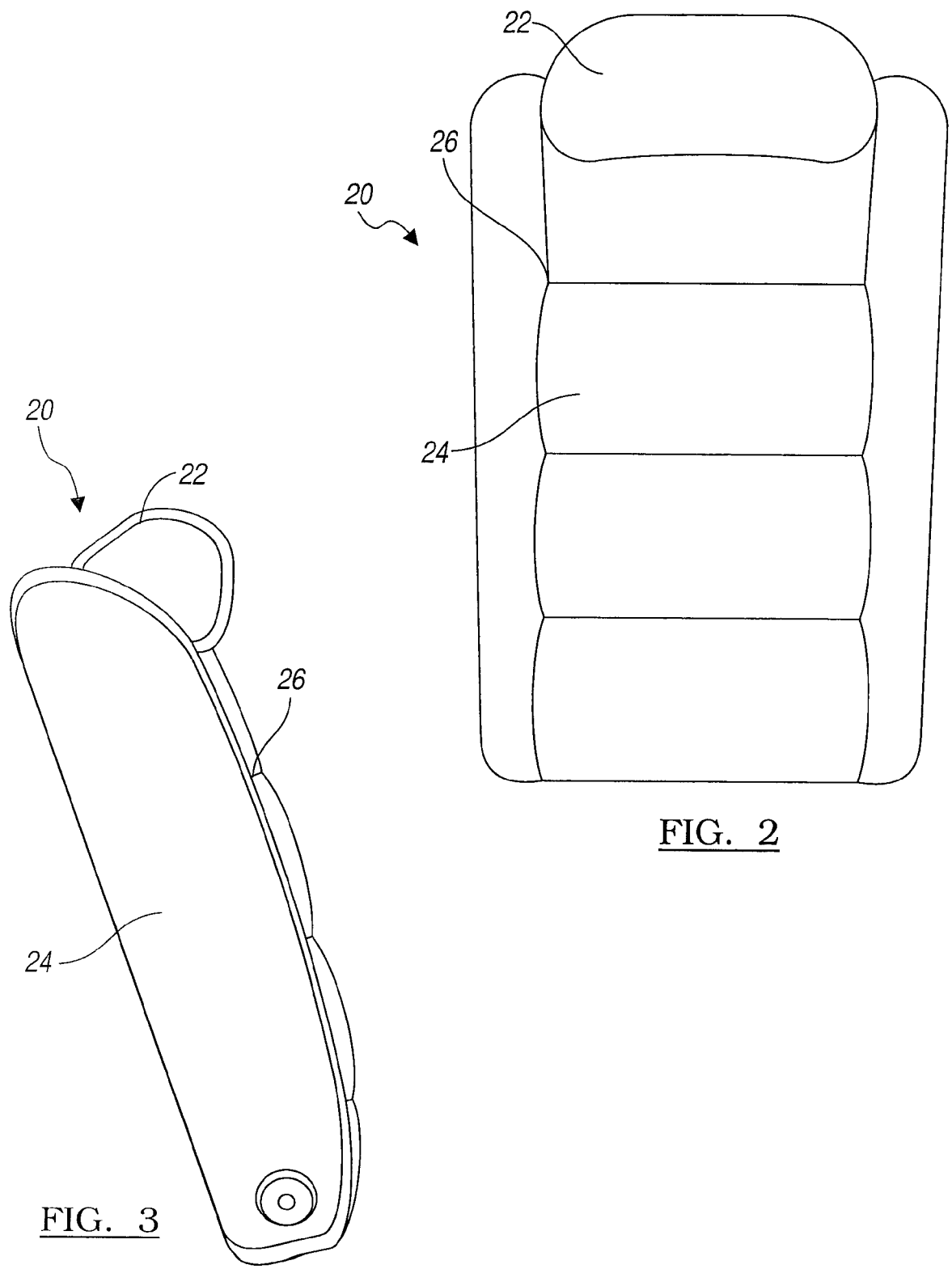

VEHICLE SEAT SYSTEM

TECHNICAL FIELD

The present invention relates to a seat system for a vehicle.

BACKGROUND

As commonly known, vehicle seat systems are required to meet governmental and customer-specific performance requirements. Particularly, there exists governmental standards (e.g., federal motor vehicle safety standards (FMVSS)) that require vehicle seat systems to maintain specific levels of rigidity and flexibility to insure adequate occupant support and safety. For example, some governmental requirements require that the vehicle seat system be able to withstand certain loads applied to headrests and seatback sections of the seat. It is known, that the above referenced governmental standards have been heightened in effort to improve occupant safety.

Now, referring to FIG. 1, a prior art system is illustrated. The prior art seat system includes a seat having a headrest 2 and a seatback 4. Headrest 2 and seatback 4 are structurally supported by a seat foam 6 and a seat frame 8 for withstanding loads indicated by the arrows "L1" and "L2". Seat foam 6 in combination with seat frame 8 provide occupant support and stability that is consistent with some governmental regulations. Some conventional vehicle seat systems also include an additional structural support that is disposed between seat foam 6 and seat frame 8 for meeting certain performance requirements. This structural support is typically formed of a steel or plastic material.

Although the conventional systems are capable of meeting certain performance requirements, there exists a wide horizon for improvement. Particularly, the conventional systems are costly and inefficient for manufacture. Additionally, the conventional structural support included on some systems adds undesirable weight and manufacturing time.

The present invention was conceived in view of these and other disadvantages of conventional vehicle seat systems.

SUMMARY

The present invention provides a seat system for a vehicle and method of manufacturing the same. The seat system includes a seat foam pad having a headrest portion and a backrest portion. A structural support member is included that is formed of a foam material that is at least partially enclosed by the headrest portion and the backrest portion. The seat system also includes a seat frame having the seat foam pad and the foam block adjacent thereto, wherein the seat foam pad and the structural support member enable the seat system to meet a predetermined structural requirement.

The method of manufacturing the seat system includes providing a seat foam pad having a headrest portion and a backrest portion wherein the seat foam pad includes an opening. The method also includes locating a structural support member formed of a foam material within the opening. The method further includes attaching the seat foam pad and the structural support member to a seat frame wherein the seat foam pad and the structural support member enable the seat system to meet a predetermined structural requirement.

The above embodiments and other embodiments, features and advantages of the present invention are readily apparent from the following detailed description of the best mode for carrying out the invention when taken in connection with the accompanying drawings.

BRIEF DESCRIPTION OF THE DRAWINGS

The features of the present invention, which are believed to be novel, are set forth with particularity in the appended claims. The present invention, both as to its organization and manner of operation, together with further objectives and advantages thereof, may be best understood with reference to the following description, taken in connection with the accompanying drawings in which:

FIG. 2 illustrates a front view of a vehicle seat system in accordance with an embodiment of the present invention;

FIG. 3 illustrates a side view of the vehicle seat system of FIG. 2 in accordance with an embodiment of the present invention;

DETAILED DESCRIPTION OF EMBODIMENTS OF THE INVENTION

By way of example, a system and method for implementing the present invention is described below. The system and methodology may be adapted, modified or rearranged to best fit a particular implementation without departing from the scope of the present invention.

Referring to FIGS. 2 and 3, a seat system 20 is illustrated. Seat system 20 is configured to meet and/or exceed various predetermined requirements. As will be described herein, the predetermined requirements include, but are not limited to, a displaced torso angle requirement and a head form displacement requirement, which are commonly found in Federal Motor Vehicle Safety Standards (FMVSS) requirements. Accordingly, seat system 20 includes a headrest portion 22 and a backrest portion 24. A trim 26 may provide an outer covering for seat system 20.

Figure 1:
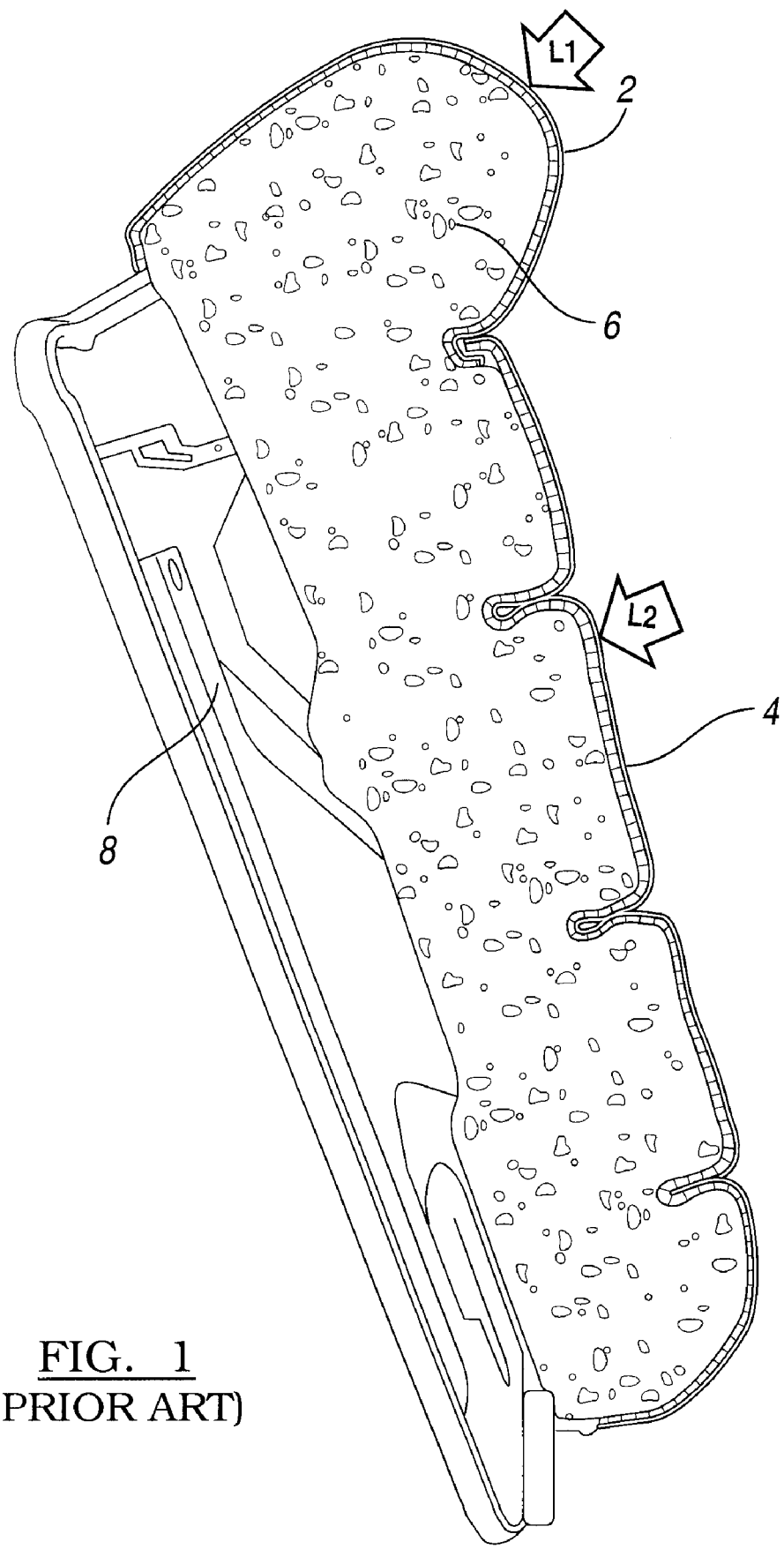
FIG. 1 illustrates a prior art vehicle seat system.
Figure 4:
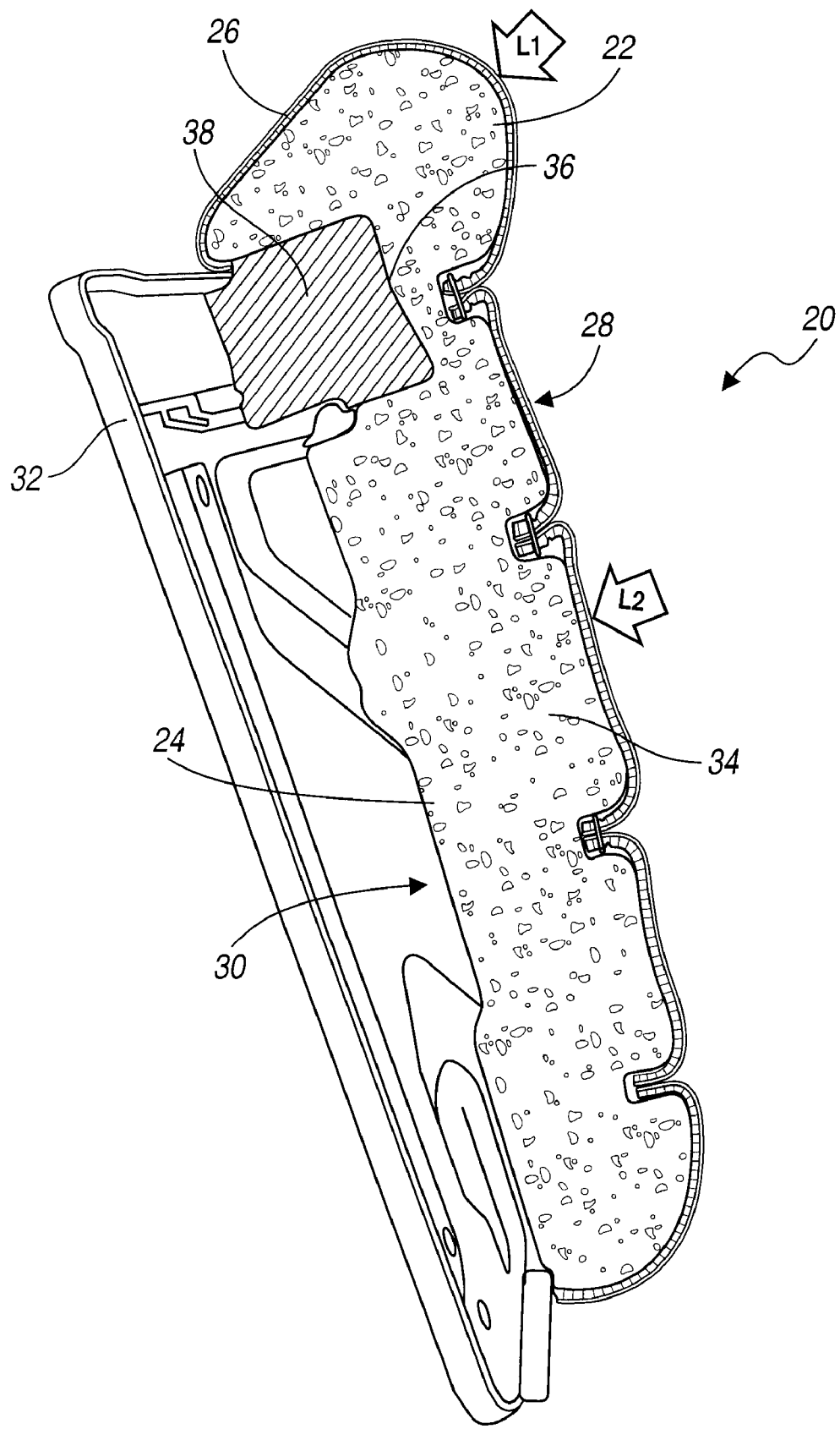
FIG. 4 illustrates a cross sectional view of a vehicle seat system in accordance with an embodiment of the present invention.

Now, referring to FIG. 4, a cross sectional view of seat system 20 is illustrated. As described above, seat system 20 includes a headrest portion 22 and backrest portion 24, both having trim 26. A front side 28 provides a surface that supports an occupant (not shown) while a rear side 30 attaches to a seat frame 32. Seat frame 32 may be formed of a metallic material such as steel. It is recognized that seat frame 32 may be comprised of any type of material that is capable of providing adequate support for seat foam pad 34, structural support member 38, and a rigid member 40 (see FIG. 5).

A seat foam pad 34 is enclosed by trim 26. Seat foam pad 34 may be formed of a urethane type foam. Seat foam pad 34 may have a particular stiffness so as to adequately support an occupant while also having a particular compressibility as to sufficiently compress when an occupant contacts front side 28. Seat foam pad 34 may also include an opening 36. Opening 36 is formed in a manner so as to allow positioning/locating of a structural support member 38.

Structural support member 38 may be formed of a foam material such as an expandable polypropylene type material. As shown, structural support member 38 is located within opening 36 so as to enable seat system 20 to meet certain structural requirements. Particularly, seat system 20 is capable of meeting both a displaced torso angle requirement and a head form displacement requirement.

Accordingly, headrest portion 22 may receive a load (L1) from, for example, an occupant's head. Additionally, back rest portion 24 may also receive a load (L2) as a result of the occupant's contact with front side 28 when seated. In response to the application of L1, headrest portion 22 may be displaced from its original unloaded condition. In the embodiments shown, this displacement of headrest portion 22 is referred to as the head form displacement. In one embodiment, the head form displacement for headrest portion 22 may be less than 76 mm upon the application of a predetermined load. In one embodiment, the predetermined load that causes such a head form displacement includes the load, L1, in a range of 365 Newton-meters to 375 Newton-meters.

Seat system 20 is also capable of meeting a displaced torso angle requirement. As indicated by the arrow labeled L2, a load (i.e., a backrest load) may be applied to front side 28 by, for example, the vehicle occupant. The load L2 may cause displacement of front side 28 from its original unloaded position. When front side 28 is displaced from the unloaded condition, the distance of displacement is measured in degrees and is referred to herein as a displaced torso angle.

In one embodiment, the structural support member 38 enables seat system 20 to withstand the load, L2 in a range of 370 Newton-meters to 375 Newton-meters thereby meeting the displaced torso angle requirement. In one embodiment, the displaced torso angle requirement also includes a displaced torso angle in a range of 35.1 degrees to 36.0 degrees upon the application of the backrest load L2, which is consistent with conventional seat systems.

Figure 5:
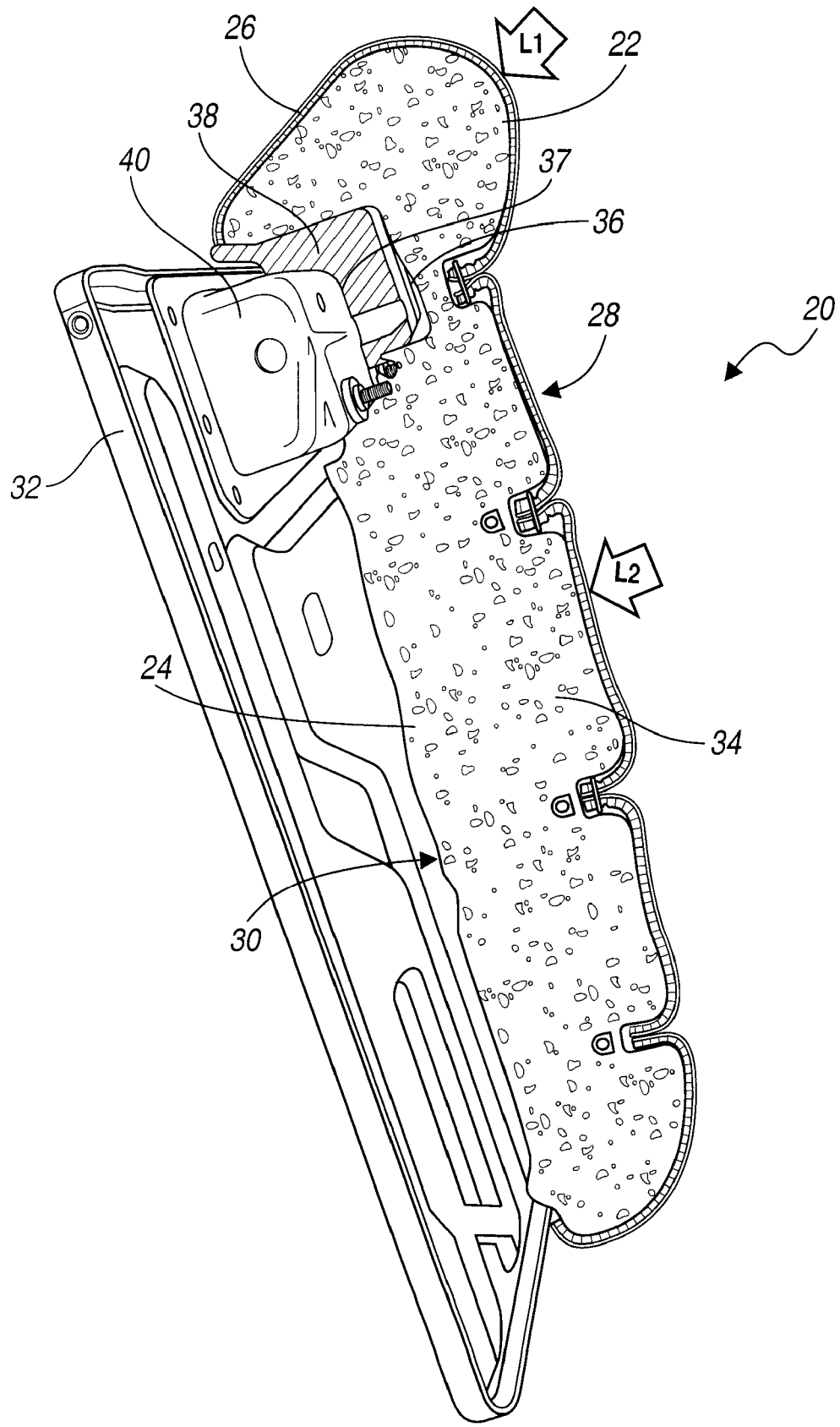
FIG. 5 illustrates yet another embodiment of a vehicle seat system in accordance with an embodiment of the present invention.

Now referring to FIG. 5, an alternative embodiment of seat system 20 is shown. As described above, seat system 20 is capable of withstanding loads L1 and L2 while meeting certain structural requirements. The embodiment shown in FIG. 5 also includes headrest portion 22 and backrest portion 24. Additionally, headrest portion 22 and backrest portion 24 include seat foam pad 34 which is covered by trim 68. Seat foam 34 also includes opening 36. Within opening 36, structural support member 38 is located. Structural support member 38 includes a deformation 37.

A rigid member 40 is connected to seat frame 32 while having an outer surface whose shape corresponds with deformation 37. In one embodiment, rigid member 40 may be comprised of a metallic material such as aluminum or steel. Rigid member 40 further enables seat system 20 to meet and/or exceed various requirements including the displaced torso angle requirement and the head form displacement requirement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat system for a vehicle comprising:
a seat foam pad having a headrest portion and a backrest portion;
a structural support member formed of a foam material that is at least partially enclosed by the headrest portion and the backrest portion; and
a seat frame having the seat foam pad and the structural support member adjacent thereto, wherein the seat foam pad and the structural support member enable the seat system to meet a predetermined structural requirement.

2. The system of claim 1, wherein the foam material includes an expandable polypropylene material.

3. The system of claim 1, wherein the seat foam pad includes a urethane type foam.

4. The system of claim 1, further comprising a rigid member connected to the seat frame and disposed between the seat frame and the structural support member.

5. The system of claim 1, wherein the seat foam pad and the structural support member meet the predetermined structural requirement by having a predetermined head form displacement upon the application of a predetermined headrest load.

6. The system of claim 5, wherein the predetermined head form displacement includes a head form displacement that is less than 76 millimeters.

7. The system of claim 5, wherein the predetermined headrest load includes a load in a range of 365 Newton-meters to 375 Newton-meters.

8. A method of manufacturing a seat system for a vehicle comprising:
providing a seat foam pad having a headrest portion and a backrest portion that together define an opening;
locating a structural support member formed of a foam material within the opening; and
attaching the seat foam pad and the structural support member to a seat frame, wherein the seat foam pad and the structural support member enable the seat system to meet a predetermined structural requirement.

9. The method of claim 8, wherein foam material includes an expandable polypropylene material.

10. The method of claim 8, wherein the seat foam pad includes a urethane type foam.

11. The method of claim 8, further comprising disposing a rigid member between the seat frame and the structural support member.

12. The method of claim 8, wherein the seat foam pad and the structural support member meet the predetermined structural requirement by having a predetermined head form displacement upon the application of a predetermined headrest load.

13. The method of claim 12, wherein the predetermined head form displacement includes a head form displacement that is less than 76 millimeters.

14. The method of claim 12, wherein the predetermined headrest load includes a load in a range of 365 Newton-meters to 375 Newton-meters.

15. A seat system for a vehicle comprising:
a seat foam pad having a headrest portion and a backrest portion;
a structural support member formed of a foam material that is at least partially enclosed within the seat foam pad such that the structural support member is enclosed in part by a portion of the headrest portion and in part by a portion of the backrest portion; and
a seat frame having the seat foam pad and the structural support member adjacent thereto, wherein the seat foam pad and the structural support member enable the seat system to meet a displaced torso angle requirement and a head form displacement requirement.

16. The system of claim 15, wherein the foam material includes an expandable polypropylene material.

17. The system of claim 15, wherein the displaced torso angle requirement includes a displaced torso angle in a range of 35.1 degrees to 36.0 degrees upon the application of a predetermined backrest load.

18. The system of claim 17, wherein the predetermined backrest load includes a load in the range of 370 Newton-meters to 375 Newton-meters.

19. The system of claim 15, wherein the seat foam pad and the structural support member meet the head form displacement requirement by having a predetermined head form displacement upon the application of a predetermined headrest load.

20. The system of claim 19, wherein the predetermined head form displacement includes a head form displacement that is less than 76 millimeters; and the predetermined headrest load includes a load in a range of 365 Newton-meters to 375 Newton meters.

* * * * *